United States Patent [19]

Ginsburg

[11] 4,244,764
[45] Jan. 13, 1981

[54] CUSHIONED TOILET SEAT WITH INNER TUBE

[76] Inventor: Milton Ginsburg, 1201 Sandringham Rd., Bala Cynwyd, Pa. 19004

[21] Appl. No.: 67,091

[22] Filed: Aug. 16, 1979

[51] Int. Cl.³ .................. B32B 5/18; B32B 31/14; B32B 31/02; B32B 5/20; A47K 13/02; A47C 7/20
[52] U.S. Cl. .................................. 156/78; 4/234; 4/237; 5/449; 5/450; 5/451; 156/118; 156/121; 156/145; 156/146; 156/156; 156/212; 156/245; 156/251; 156/285; 26.4/46.4; 264/46.5; 297/452; 297/458; 297/DIG. 1; 297/DIG. 3; 428/68; 428/71; 428/134; 428/136; 428/137; 428/138; 428/322
[58] Field of Search .............. 4/237, 234; 5/449, 450, 5/451; 156/118, 156, 212, 245, 285, 79, 78, 121, 145, 146, 251; 264/46.4, 46.5; 297/452, 458, DIG. 1, DIG. 3; 428/68, 71, 72, 134, 136, 137, 138, 322

[56] References Cited

U.S. PATENT DOCUMENTS

| | | | |
|---|---|---|---|
| 2,671,226 | 3/1954 | Lychenheim | 5/449 X |
| 3,043,049 | 7/1962 | Gleason | 5/449 X |
| 3,379,800 | 4/1968 | Wert | 264/46.4 |
| 3,640,831 | 2/1972 | Gardner et al. | 428/72 |
| 4,155,127 | 5/1979 | Seiderman | 4/237 X |

Primary Examiner—William A. Powell
Assistant Examiner—Robert A. Dawson
Attorney, Agent, or Firm—Paul & Paul

[57] ABSTRACT

A cushioned toilet seat is made by first forming a sealed air-and-water tight annular inner tube having a configuration corresponding to that of the end product, then vacuum forming an annular recess or cavity in a first sheet of a cover material, then placing the previously formed sealed inner tube into the annular cavity, then placing a rigid annular member into the cavity on top of the inner tube, then placing a flat sheet of cover material over the cavity, and sealing it closed. Variations are disclosed in one of which the inner tube is filled or partially filled with a polyurethane foam produced by placing a quantity of expandable foamable polyurethane resin reaction mixture in the inner tube before sealing and then sealing the inner tube closed before the foam is fully expanded. In another embodiment, the inner tube is filled or partially filled with water.

6 Claims, 17 Drawing Figures

CUSHIONED TOILET SEAT WITH INNER TUBE

BACKGROUND OF THE INVENTION

This invention relates to cushioned toilet seats.

Cushioned toilet seats are well known. Such seats are, for example, shown in Ginsey U.S. Pat. Nos. 3,772,111 and 3,939,432; Pastl 2,899,689; Harrison 3,845,183, Samuels 3,639,922 and 2,771,612; and others.

Cushioned toilet seats have become very popular. They ordinarily include an expanded polyurethane foam. Such foam material has become increasingly expensive, and there is commercial demand for cost reduction.

SUMMARY OF THE INVENTION

A principal object of the present invention is to provide a relatively inexpensive cushioned toilet seat.

Another object is to provide a relatively inexpensive soft toilet seat which uses, as the cushioning element, an inner tube containing air.

Another object is to provide a relatively inexpensive soft toilet seat which uses, as the cushioning element, an inner tube containing water.

Another object is to provide a relatively inexpensive cushioned toilet seat which uses, as the cushioning element, an inner tube containing a polyurethane foam material which is formed during production of the seat.

DETAILED DESCRIPTION OF THE PREFERRED EMBODIMENTS

Figure 1:
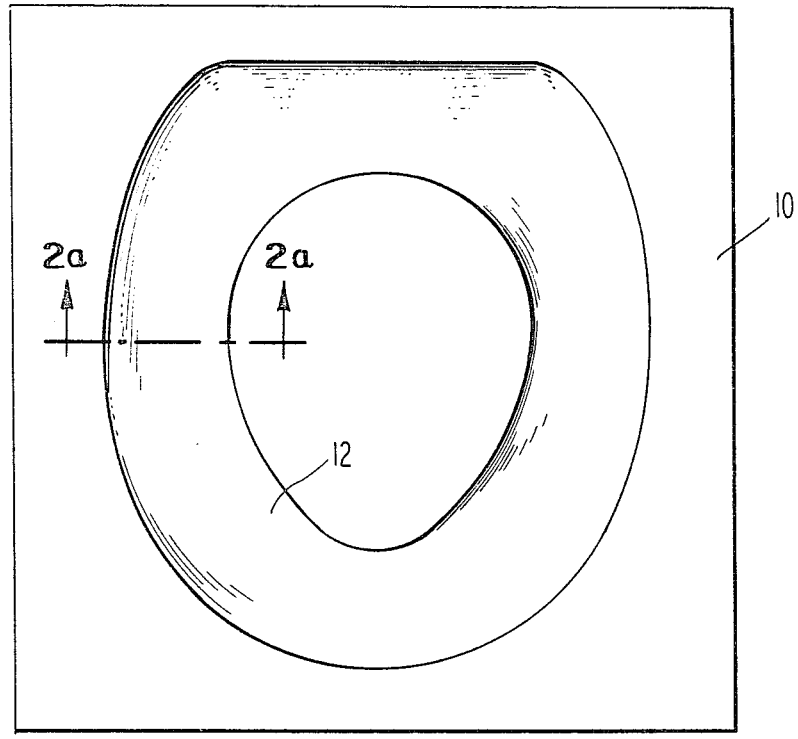
FIG. 1 is a schematic plan view of a mold having an annular cavity having a configuration corresponding to that of the soft toilet seat which is to be produced.

FIG. 1 is a schematic plan view of a mold 10 having an annular cavity 12. Such molds are well known in the art and have been used in the production of cushioned toilet seats for vacuum forming one piece of a two-piece vinyl film casing or cover. The two cover pieces, when sealed, encase an annular rigid support member and an annular molded foam cushion.

In the method of the present application, mold 10 may be used for two purposes; (1) vacuum forming one piece of an inner tube and (2) vacuum forming one piece of a cover or casing. However, in lieu of using the same mold, two separate but similar molds may be employed.

In the description which follows, two separate but similar molds identified 10 and 100 will be assumed.

Figure 2A:
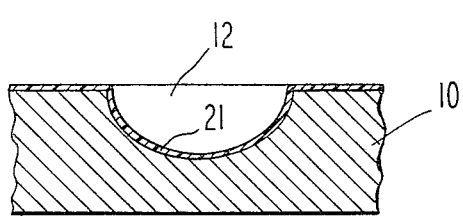
FIG. 2a is a view, in section, looking along the line 2a—2a of FIG. 1.
Figure 2B:
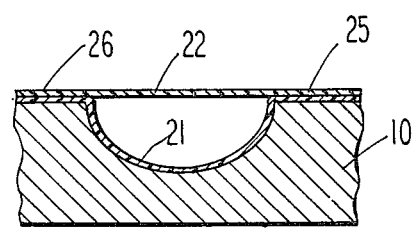
FIGS. 2b, 2c and 2d are views, in section, looking along the line 2a—2a of FIG. 1 and illustrating the sequential steps which are taken to produce the airtight inner tube.
Figure 2C:
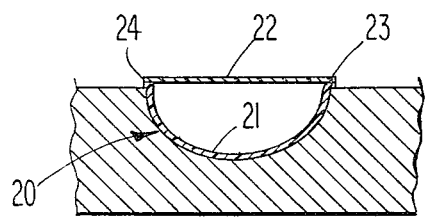
Figure 2D:
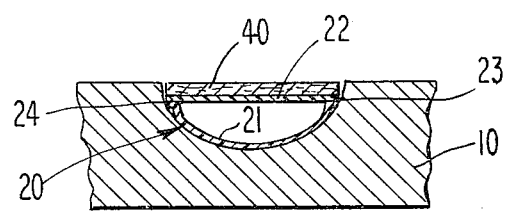

FIG. 2a shows the vacuum forming of a first piece 21 of the inner tube. Piece 21 is made of material, such as rubber, which is impervious to both liquid and gas. In short, material 21 is air-and-water tight. In the first step of the process, sheet 21 is vacuum formed in cavity 12 of mold 10 into an open-topped annulus. The second step, illustrated in FIG. 2b, is to place a second sheet 22 of similar air-and-water tight material on top of the mold 10 containing the vacuum-formed first piece 21. The third step is to heat seal, as by dielectric heat sealing equipment, the first and second pieces 21, 22 together at the inner and outer peripheral edges 23 and 24 (see FIG. 2c). The excess material, indicated in FIG. 2b by reference numerals 25 and 26, is then torn away at the seals, leaving a sealed inner tube 20 in mold 10, as shown in FIG. 2c. FIG. 2d represents placing an annular rigid support member 40 on top of the sealed inner tube 20. When this is done, the weight of the annular rigid member 40 compresses the air which is captive within the sealed inner tube. It is not necessary that the annular rigid member 40 be placed on top of inner tube 20 while the inner tube is still in mold 10. This can be done after the inner tube 20 has been removed from mold 10 and placed in the cavity of the cover member, as shown in FIG. 2f, and as will be described.

Figure 2E:
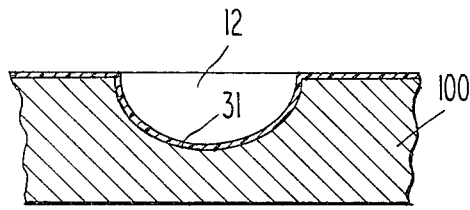
FIGS. 2e, 2g and 2h are views looking along the line 2a—2a of FIG. 1 illustrating the sequential steps which are taken to produce the final product, containing the sealed inner tube and a rigid annular member.
Figure 2F:
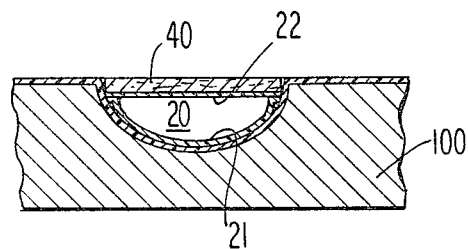

Referring now to FIG. 2e, this figure depicts vacuum forming an annular cavity or recess in a first sheet 31 of cover material, preferably a vinyl cover film of pleasing color and design. The vacuum forming of sheet 31 is indicated as taking place in a mold 100 which may be substantially similar to mold 10 of FIG. 1. The sectional view in FIG. 2e is similar to that taken along the line 2a—2a of FIG. 1.

Figure 2G:
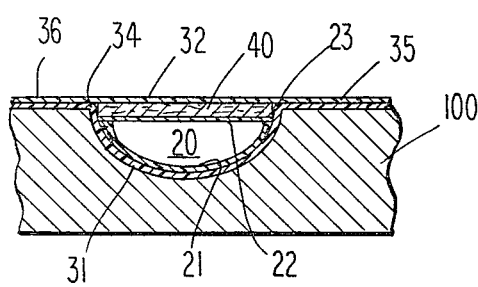
Figure 2H:
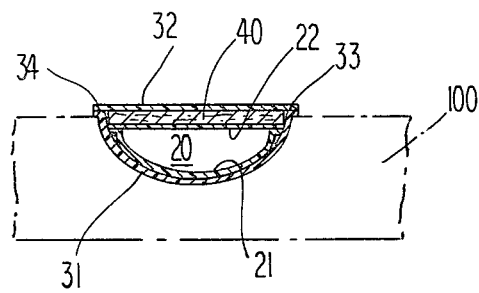

After the annular trough or recess or cavity is formed in sheet 31, the sealed inner tube 20 is dropped into the cavity 12 and the rigid annular member 40 is placed on top of the sealed inner tube. This compresses the captive air within the sealed inner tube 20, as is indicated in FIG. 2f. The next step is to place the second sheet 32 of cover film over the annular cavity 12, as is indicated in FIG. 2g. The two sheets 31 and 32 of cover material are then sealed together at the peripheral edges 33 and 34 of the annular cavity and the excess material 35 and 36, inside and outside of the annular cavity, is removed by tearing away at the seals 33,34.

The end product produced by the steps just described is a soft or cushioned toilet seat containing an air-filled inner tube 20 and a rigid annular support plate 40, both covered by an attractive decorative cover consisting of the film sheets 31 and 32 sealed at the peripheral edges 33,34.

Figure 3A:
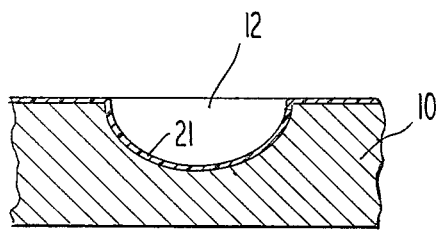
FIGS. 3a, 3b, 3c and 3d are similar to FIGS. 2a, 2b, 2c and 2d but illustrate the sequential steps which are taken when an expandable foamable polyurethane resin reaction mixture is placed within the inner tube before it is sealed.
Figure 3B:
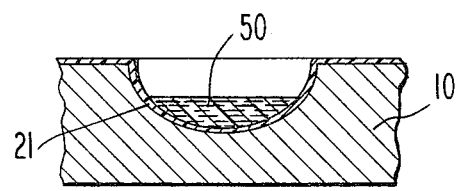
Figure 3C:
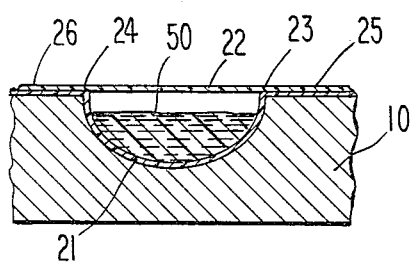
Figure 3D:
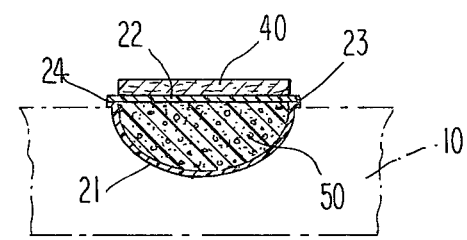

FIGS. 3a through FIG. 3d are similar to FIGS. 2a-2d but illustrate a variation in which an expandable foamable polyurethane resin reaction mixture 50 is placed in the annular cavity formed by the vacuum molding of impervious inner-tube sheet 21 before the second impervious sheet 22 is placed thereon and heat sealed together. FIG. 3c shows the second impervious sheet 22 placed on the first sheet 21, ready to be heat sealed. The foamable material 50 is expanding but has not yet filled the entire interior of the inner tube. In FIG. 3d, the entire interior of the inner tube has been filled by the expanded foam material.

Figure 4A:
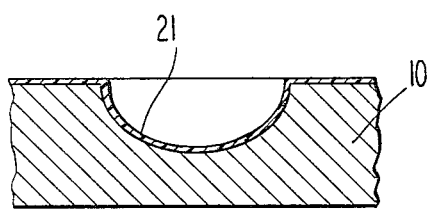
FIGS. 4a, 4b, 4c and 4d are similar to FIGS. 2a, 2b, 2c and 2d but illustrate the sequential steps which are taken when water is placed in the inner tube before it is sealed.
Figure 4B:
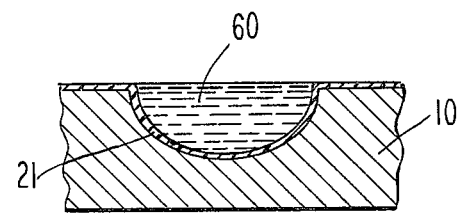
Figure 4C:
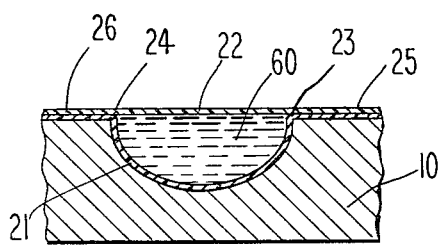
Figure 4D:
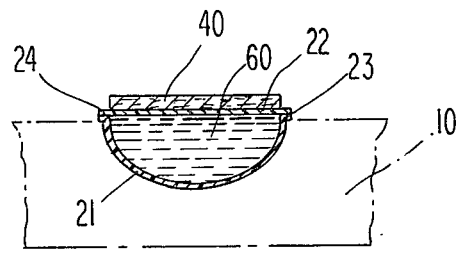

FIGS. 4a through FIGS. 4d are also similar to FIGS. 2a-2d but illustrate yet another variation. In FIG. 4b, water 60 is illustrated as having been poured into the annular cavity formed by the vacuum forming of impervious sheet 21. In FIG. 4c, the second impervious sheet 22 is shown placed over the annular recess, ready to be heat sealed at the peripheral edges 23,24. In FIG. 4d, the excess material 25,26 inside and outside of the annular cavity has been torn away and removed.

What is claimed is:

1. A method of making a cushioned toilet seat comprising the steps of:
    a. molding, by vacuum forming in a mold, an open-top annulus comprising the first piece of a two-piece inner tube of flexible material substantially impervious to liquid and air;
    b. placing a second piece of flat similar inner tube material over the open-top annulus of said molded first piece while still in said mold;
    c. heat sealing together in said mold said first and second pieces of inner tube at the inner and outer peripheral edges of the annulus;
    d. removing the excess material both inside and outside of said inner and outer peripheral edges;
    e. removing the molded sealed inner tube from the mold;
    f. molding, by vacuum forming in a mold, an open-top annulus comprising the first piece of a two-piece cover of vinyl plastic;
    g. placing the valveless molded sealed inner tube into the open-top annulus of the cover while still in the mold;
    h. placing an annular rigid member into said open-top cover annulus on top of said sealed inner tube, the weight of said rigid member functioning to compress the air which is captive within said sealed inner tube, thereby to firm up the sealed inner tube;
    i. placing a second piece of flat similar cover material over the open-top annulus containing said inner tube and annular rigid member;
    j. heat sealing together in said mold said first and second pieces of cover material at the inner and outer peripheral edges of the annulus; and
    k. removing the excess cover material both inside and outside of said inner and outer peripheral edges.

2. A method according to claim 1 including the additional step of at least partially filling the open-top annulus of said inner tube with water before placing said second piece of flat inner tube material thereover and before heat sealing together said first and second pieces of inner tube.

3. A method according to claim 1 including the additional step of inserting a foamable polyurethane resin reaction mixture into said open-top annulus of molded inner tube before placing said second piece of flat inner-tube material thereover and before heat sealing together said first and second pieces of inner tube.

4. The method of making a cushioned toilet seat comprising the steps of:
    a. mold-forming an annular recess in a first sheet of material impervious to air and water to form the first portion of an annular inner tube;
    b. placing a second sheet of similar impervious material in contiguous relation to the annular recess of the mold-formed first sheet;
    c. heat sealing the first and second sheets together along the inner and outer peripheral edges of the annular recess;
    d. removing the excess sheet material inside and outside of the seals to form a sealed inner tube;
    e. mold-forming an annular recess in a plastic cover sheet to form the upper portion of an annular cover member;
    f. placing the sealed inner tube in the annular recess of the cover sheet;
    g. placing an annular rigid member in the annular recess of the cover member on top of the inner tube contained therein, the weight of said annular rigid member functioning to compress the air which is captive within the sealed inner tube;
    h. placing a second sheet of plastic cover film in contiguous relation to the annular recess of the mold-formed first sheet of cover material;
    i. heat sealing the first and second cover sheets together along the inner and outer peripheral edges of the annular recess;
    j. removing the excess film cover sheet material inside and outside of the annular seals.

5. The method according to claim 4 including the additional step of at least partially filling the mold-formed annular recess in the first sheet of impervious material before placing the second sheet in contiguous relation to the annular recess and before heat sealing the first and second sheets together.

6. The method according to claim 4 including the additional step of injecting an expandable foamable polyurethane resin reaction mixture into the mold-formed annular recess in the first sheet of impervious material before placing said second sheet of impervious material in contiguous relation to the annular recess and before heat sealing said first and second sheets together.

* * * * *